United States Patent [19]

Dulin et al.

[11] 3,984,312

[45] Oct. 5, 1976

[54] PROCESS FOR INSOLUBILIZING POTENTIALLY WATER POLLUTABLE WASTES FROM SODIUM OR AMMONIUM TYPE SULFUR DIOXIDE AIR POLLUTION CONTROL SYSTEMS

[75] Inventors: Jacques M. Dulin, Libertyville, Ill.; Edward C. Rosar, Lakewood, Colo.; Joseph M. Genco, Orono, Maine; Harvey S. Rosenberg, Columbus, Ohio

[73] Assignee: Industrial Resources, Inc., Chicago, Ill.

[22] Filed: Oct. 31, 1973

[21] Appl. No.: 411,367

Related U.S. Application Data

[63] Continuation-in-part of Ser. No. 353,508, April 23, 1973, abandoned.

[52] U.S. Cl............................ 210/15; 106/DIG. 1; 210/43; 210/50; 210/56; 210/59; 423/202; 423/548; 423/556; 423/558
[51] Int. Cl.$^2$........................................... C02B 1/34
[58] Field of Search.............. 55/73; 210/42, 43, 45, 210/50–53, 56, 59, 15, 63; 423/146, 202, 242, 244, 547, 558, 114, 128, 556; 75/108, 109, 115, 116; 106/DIG. 1

[56] References Cited
UNITED STATES PATENTS

| | | | |
|---|---|---|---|
| 2,296,423 | 9/1942 | Clark | 423/558 |
| 3,468,797 | 9/1969 | Myers | 210/59 |
| 3,505,008 | 4/1970 | Frevel et al. | 55/73 |
| 3,617,559 | 11/1971 | Cywin | 210/53 |
| 3,720,609 | 3/1973 | Smith et al. | 210/59 |
| 3,763,038 | 10/1973 | Misako et al. | 210/53 |
| 3,785,840 | 1/1974 | Minnick et al. | 106/DIG. 1 |
| 3,859,799 | 1/1975 | Jaco | 106/DIG. 1 |

OTHER PUBLICATIONS

Mellor, "A Comprehensive Treatise on Inorganic & Theoretical Chemistry," vol. 14 p. 345.

*Primary Examiner*—Charles N. Hart
*Assistant Examiner*—Peter A. Hruskoci
*Attorney, Agent, or Firm*—Jacques M. Dulin

[57] ABSTRACT

Process for insolubilizing water soluble wastes from alkaline sodium or ammonium type sulfur dioxide control systems used in conjunction with industrial or power plants. The sodium or ammonium sulfite or sulfate wastes are reacted in solution with ferric ions and sulfuric acid to produce an insoluble basic, hydrous or anhydrous, sodium and/or ammonium hydroxy ferric sulfate or sulfite compounds of the generic type $M_v$ $(Na, NH_4)_w Fe_x (SO_u)_y (OH_z)n H_2 O$, wherein M is selected from an alkali metal other than sodium, or an authigenic metal or other cation present in industrial or power plant wastes, $v$ is selected from zero to six, $w$ is selected from zero to five, $x$ is selected from zero to six, $y$ is selected from one to five, $u$ is 3 and/or 4, $z$ is selected from zero to 12, and $n$ is selected from zero to 20. Principal end product compounds include Natrojarosite, Ammoniojarosite, Metasideronatrite, Sideronatrite, Depegite, Rosarite, Iriite, and mixtures thereof. The reaction takes place at an acid pH in a temperature ranging from about 50°–300°F. and may occur in single or multi-stage reactors. Air and/or bacterial activation at a pH of less than about 5.5 may be employed. The end product basic, sodium and/or ammonium hydroxy ferric sulfate and sulfite compounds are water insoluble as compared to the standard in the industry, $CaSO_4$, and may be disposed of by simple landfill without the water pollution hazards inherent with landfilling of wet or dry sodium or ammonium sulfite and/or sulfate baghouse or wet scrubber wastes. The process also uses, and conversely can dispose of, other pollutants as reactants, such as hot waste water from power plant ash tanks, waste sulfuric acid, pickle liquor, acid mine water (blackwater), iron slag or scrap, or gob or pyrite leachate as part of an integrated, multiple-pollutant disposal process.

40 Claims, No Drawings

PROCESS FOR INSOLUBILIZING POTENTIALLY WATER POLLUTABLE WASTES FROM SODIUM OR AMMONIUM TYPE SULFUR DIOXIDE AIR POLLUTION CONTROL SYSTEMS

RELATED CASE

This application is a continuation-in-part of our co-pending application of the same title Ser. No. 353,508, filed Apr. 23, 1973, now abandoned in favor of this application.

FIELD

The invention relates to insolubilizing wastes from air pollution control processes which employ sodium or ammonium-containing compounds to react with $SO_2$ in flue gases to clean up the flue or stack gases. After reacting with the $SO_2$, the resultant sodium or ammonium sulfate/sulfite compounds are water soluble and pose a water pollution problem in their disposal. The process of the instant application produces an insoluble solid product which may be simply disposed of by landfilling without posing serious water pollution problems. The end products may be characterized as basic, insoluble, sodium or ammonium hydroxy ferric sulfate or sulfite compounds which may be in an anhydrous or hydrated state. Typical end products include Natrojarosite, Ammoniojarosite, and Sideronatrite. The process also provides for disposal of polluted hot waste water from industrial or power plant processes, waste sulfuric acid, low grade waste iron scrap, steel furnace dust, ferrous wastes from local municipal incinerators, steel manufacturing pickle liquors, pyrite or gob dump leach waters, acid mine waters and the like.

BACKGROUND

It is estimated that from 20 to 35 million tons of sulfur dioxide were vented to the atmosphere in the United States in 1972 from industrial plants and power plants by burning fossil fuels containing bound sulfur. As a result of the ambient air quality standards and pollution control laws, there have evolved an estimated fifty different processes for removal of the sulfur from the fuel or for clean-up of the $SO_2$ from the flue gases resulting from the fuel combustion.

Principal among these processes are wet scrubbing systems employing an alkaline additive which reacts with the $SO_2$. The most utilized wet scrubber additive has been a calcium based material such as lime or limestone. In these processes, the calcium oxide, hydroxide or carbonate reacts with the $SO_2$ to form calcium sulfate. The calcium sulfate is relatively insoluble and may be removed from the waste water and disposed of in sludge ponds.

However, calcium systems and scrubbers pose several problems. Initially, the energy required to pump the water through the scrubber is relatively high as compared, say, to a baghouse system which uses air rather than water. In addition, scrubbers are prone to scale formation due to the ash from fuel such as coal collected in the scrubber water. The scaling problem may be complicated by the precipitation of calcium sulfate in the scrubber or downstream demister. Further, the relatively low reactivity of a calcium system, as compared to a sodium system, means that the liquid/gas ratio must be relatively high, the concentration of the calcium alkali in the solution is relatively low, and there must be recycle of unreacted alkaline calcium compounds. The recovery of the calcium sulfate as a sludge from the scrubber water is complicated by the inverse solubility exhibited by that compound. Thus, when the hot flue gases come in contact with the scrubber water, the calcium sulfate is less soluble at higher temperatures and tends to precipitate in the scrubber rather than in external separation tanks.

In order to overcome the inverse solubility problem, the concentrations in the scrubber water must be kept low and this results in low efficiency. In addition, the external settling tanks should be kept heated, which in northern climates is a relative impossibility.

Sodium and ammonium alkaline compounds have been proposed for wet scrubbers. These compounds have the advantage of increased reactivity and a low liquid/gas ratio due to the fact that the end products sodium or ammonium sulfate/sulfite are highly soluble in the scrubber water. Although these compounds do have a degree of inverse solubility, the sodium or ammonium sulfate is so highly soluble even at the warmer scrubber temperatures that it does not precipitate in the scrubber.

However, the solubility of the end products sodium or ammonium sulfate and sulfite have prevented the adoption of such systems since the disposal of soluble products poses potential water pollution problems. To avoid trading water pollution for air pollution, there have been proposed so-called double-alkali processes in which a sodium or ammonium system is used in the scrubber in order to avoid the plugging problems, and the sodium or ammonium sulfate is reacted externally with lime to produce insoluble calcium sulfate.

However, such double-alkali processes have met with practical difficulty insofar as the excess oxygen present in the flue gases of power plants and the like have been sufficient to produce predominantly sodium sulfate. The sodium sulfate, as contrasted to sodium sulfite, does not react well with calcium oxides, hydroxides or carbonates to produce the insoluble calcium sulfate.

As a result of the inherent complexities and high energy demand of scrubbers, there have been proposed dry systems for $SO_2$ control. The best of the dry systems involves injection of a dry additive material just upstream of a baghouse. The baghouse serves two purposes, to collect the dry additive material, thereby providing a site for reaction of the $SO_2$ with the additive, and also to function as a particulates filter aid for fly ash, processing dust and the like in the flue gas. While many dry sorbents have been tried, the sodium-containing dry additives appear to be far more reactive than any others, including calcium-based additives.

These sodium-type dry additive materials react in the baghouse to form sodium sulfite or sulfate with other percentages of persulfites (pyrosulfites), persulfates (pyrosulfates), bisulfates and bisulphites as the case may be. The resultant cake, hereinafter called a sulfate cake for simplicity, poses a potential water pollution problem in connection with its disposal. Although these cakes can be successfully landfilled, the problem is primarily economic since to prevent leaching of soluble sodium sulfate from the fly ash-containing sulfate cake, the landfill must be specially constructed and continuously monitored to meet statuatory limitations on leaching and ground water contamination. As a result of the water pollution problem posed by the sulfate cake waste products, no sodium system dry additive baghouse injection processes have been adopted for pollution control although they appear to be the least expensive $SO_2$ control system proposed to date.

Non-ferrous metal smelters are a principal source of $SO_2$ pollution from off-gases of roasters, reverbatory furnaces and converters. Recent estimates indicate that copper smelters alone account for some 3.6 million tons of $SO_2$ emissions, of which only 600,000 tons are being recovered as sulfuric acid. The two oldest flue gas desulfurizing processes that were specially developed for treating lean or less concentrated $SO_2$ smelter gas streams are the Cominco ammonia process in use since 1916, and the Asarco dimethylanaline process developed in the 1950's.

The Cominco process uses ammonia for sequestering sulfur oxides from lean (0.6 to 2.0 percent $SO_2$) streams and reduces exit sulfur oxides concentration to some 1000 ppm. The process recovers almost 100 percent concentrated sulfur dioxide stream and, as a byproduct, produces ammonium sulfate. In early Cominco operations, strong or 100% concentrated sulfur dioxide streams were converted into elemental sulfur by a so called "incandescent carbon" process. Later, when Cominco undertook production of fertilizers, all recovered sulfur dioxide was converted into sulfuric acid, the situation that presently exists.

Technically, the Cominco process, in combination with the conversion of strong sulfur dioxide streams into sulfuric acid, would provide required sulfur level control in most of existing copper smelters, if ammonium sulfate and sulfuric acid disposal problems could be satisfactorily resolved. The performance of this process on a copper reberberatory furnace has, however, not been commercially demonstrated.

Asarco's dimethylaniline process is another potential sulfur oxides control method that was aimed to desulfurize lean smelter flue gas streams containing greater than 1.5 percent sulfur dioxide concentration. In its original process configuration (identical to Sulfidene process in Germany), the DMA process was operated at Asarco's Selby smelter in California for a number of years while reaching its highest recovery capacity of some 40 tons $SO_2$ per day. In 1971 the Selby smelter and with it the DMA process was shut down. Since DMA as a sulfur oxides sequestering agent capacity-wise is inferior at low sulfur oxides concentration to xylidine (sorbent used in Germany), in 1970 Asarco undertook DMA process modifications which are still in progess.

The DMA process is capable of reducing sulfur oxides concentration in the purified gas to about 500 ppm while producing almost 100 percent sulfur dioxide stream for conversion into sulfuric acid or into liquid sulfur dioxide product. Besides, the original DMA process produces another byproduct, sodium sulfate, at a rate of some 45 lbs/ton of recovered $SO_2$. Recent DMA process modifications, as far as it is known, are related to avoiding production of sodium sulfate byproduct and attempting to dispose sulfates in the form of gypsum.

Since the DMA process has never gained acceptance by industry on a large, industrial scale, and is still undergoing further development, it can not be considered as being readily available for treating lean sulfur oxides streams at existing copper smelters. If successfully developed, the DMA process in combination with sulfuric acid plants could render adequate sulfur oxides emission control at majority of copper smelters.

Other present day lean flue gas desulfurizing processes to be mentioned are sodium sulfite/bisulfite systems, and lime/limestone based systems, the latter of which was discussed above. The first system is regenerable one, producing a concentrated sulfur dioxide stream, while the second does not recover sulfur values, i.e. is nonregenerable.

The sodium sulfite/bisulfite system is capable of desulfurizing flue gas streams containing from 0.02 to 1.5 percent sulfur dioxide. In case of oil fired boiler flue gas or tail gases from sulfuric acid or Claus plants, this system is capable of reducing sulfur oxides concentration in the exit gas to less than 50 ppm. As with all sulfite/bisulfite systems, there is an appreciable sulfate purge stream (equivalent to some 5 to 25 percent of incoming $SO_2$) subject to disposal. In combination with sulfuric acid plant, treating strong smelter streams, this process, if specially developed for smelters, could provide an adequate sulfur oxides control for meeting AAQS (ambient air quality standards).

In all three of the above-proposed smelter processes there is a presently unsolved disposal problem, of ammonium sulfate in the Cominco process, and of sodium sulfate in the Asarco DMA process, the Sulfidene process and the sodium sulfite/bisulfite process. The sulfate insolubilization process of this invention removes a significant barrier to the commercial adoption of the above known smelter $SO_2$ control processes.

To date we know of no success of others in the art to devise a system for the insolubilizing of sulfate cake or sulfate-containing wastes so that sodium based systems may be used for $SO_2$ control. Indeed, we have been told that until the problem of insolubilizing the sodium or ammonium sulfite/sulfate containing wastes at an economic level is solved, sodium or ammonium systems, wet or dry, will not be adopted by utilities or industry for flue gas $SO_2$ emission control, even though such systems are cheaper.

In the unrelated hydrometallurgy art, proposals have been made to remove metals, e.g. iron and/or aluminum, alone or concurrently, from copper dump leachate solutions.

Thus, for example, U.S. Pat. No. 2,296,423 discloses a method whereby acid solutions containing iron (or iron and aluminum) are subjected to high temperature and pressure in an autoclave to hydrolize sulfates of ferric iron and aluminum and precipitate basic salts with a simultaneous generation of free acid. According to the patent, oxidation of iron to the ferric state is promoted by the direct injection of oxygen into the solution while the solution is at high temperature and pressure. The patent further teaches the addition of an alkali salt, e.g., sodium sulfate or sodium chloride, to promote the precipitation. Soluble iron oxides are added to partly consume the free acid generated in the autoclave operation. The precipitate formed under the conditions taught by the patent is disclosed to be a double basic salt of alkali metal and iron, $Na_2SO_4 \cdot 3Fe_2(OH)_4 \cdot SO_4$, somewhat analogous to, but apparently different from the natural mineral Natrojarosite, $NaFE_3(SO_4)_2(OH)_6$. The patent further teaches that if aluminum is present in the solution both the iron and aluminum can be nearly completely precipitated as a complex basic iron aluminum alkali sulfate.

U.S. Pat. No. 3,434,947 is directed to separation of iron from zinc sulfate solutions produced in hydrometallurgical leaching of "Calcine," a roasted sulfide ore concentrate. The iron is precipitated in the presence of $K^+$, $Na^+$, $NH_4^+$ ions in a concentration of 1/10 to ¼ the amount of the iron content in g/l. Ferrous ion is oxidized to ferric ion by $MnO_2$ and the solution is partly neutralized with ZnO prior to the precipitation. The basic iron sulfate precipitated is described in related U.S. Pat. No. 3,684,490 as being jarosite and the K, Na and/or ammonium source being an unnamed salt.

Sideronatrite, Metasideronatrite, Natrojarosite, and Ammoniojarosite are found in nature (See Palache, C.; Berman, H.; Frondel, C.; Dana's System of Mineralogy, Vol. II, John Wiley & Sons, 7th Ed., 1951, pp 562, 563, 603, 604). However, the conditions under which formation of these compounds occurred in nature is unknown. Scharizer, in Za.Kr., Vol 41 (1906) p. 215 reports formation of Sideronatrite by slow precipitation at room temperature over a period of months. Mellor, A Comprehensive Treatise of Inorganic & Theoretical Chemistry, Vol 14, p. 345 (1935) Longmanns Green & Co., reports on work by Skrabal, A., Zeit. anorg. Chem., Vol. 38, (1904) p. 319, as preparing Sideronatrite under conditions of high Na, Fe and $SO_4$ concentration by heating sodium and ferric sulfate in the presence of sulfuric acid on a hot plate. The above appears to us to be the most relevant prior art on the subject of which we have present knowledge.

THE INVENTION

Objects

It is among the objects of this invention to provide a process for insolubilizing sulfate and sulfite cake or wastes from liquid or dry $SO_2$ removal systems employing ammonium or sodium-type reactants or sorbents.

It is another object of this invention to produce an insoluble material which can be simply and cheaply landfilled, thereby making available for $SO_2$ control technology the various sodium and ammonium systems proposed for wet scrubbers and dry additive injection processes.

It is another object of this invention to provide a process which utilizes a multiplicity of waste materials to produce an insoluble material which can be simply landfilled without danger of polluting ground water.

It is another object of this invention to provide a process for insolubilizing "sulfate"-containing waste water or filter cakes from $SO_2$ control processes employing sodium or ammonium type of sorbents or reactants, and which simultaneously provides for a method of disposal of hot waste water from industrial or power plant processes, steel plant pickle liquors, waste sulfurous or sulfuric acid or acid-containing waters or mine waters, and waste iron-containing materials such as low grade scrap iron, iron furnace dust, ferrous wastes from local municipal incinerators, iron containing waters or slag, iron pyrites from coal washing, acid mine waters, and the like.

It is another object of this invention to provide a process for producing insoluble compounds, which are principally sodium or ammonium hydroxy ferric sulfate or sulfite compounds from waste sulfate cake, scrubber sludge or other $SO_2$ control process effluent.

It is another object of this invention to provide a process which simultaneously disposes of sodium or ammonium sorbent waste products, hot waste water, waste acid-containing liquors or waters, and waste iron to produce insoluble products which may be simply landfilled without danger of air or water pollution.

It is another object of this invention to provide a process for the reaction of a sodium or ammonium sulfite- or sulfate-containing solution with a ferric sulfate-containing solution to produce sodium or ammonium hydroxy ferric sulfate or sulfite compounds which are insoluble and may be disposed of by simple landfill.

It is another object of this invention to provide a pollution control process which produces an insoluble product from a formerly soluble sodium or ammonium compound at a relatively acid pH and which optionally may employ bacterial activation, air, $CO_2$, ammonia and the like.

Still further and other objects of this invention will be evident from the description which follows.

SUMMARY

Sodium or ammonium sulfate containing solutions, derived from wet scrubber wastes or dissolved baghouse filter cakes, are reacted abiotically or biotically in a single or multi-stage reaction with ferric sulfate solutions, derived in turn from an iron-containing source and a sulfuric acid-containing liquid at a temperture of between about 50°–300°F. at an acid pH to produce sodium or ammonium hydroxy ferric sulfate or sulfite products, which may be anhydrous or hydrated. These end products are generally crystalline, water insoluble and may be easily dewatered or dried, and thereafter landfilled without posing severe water pollution problems.

With respect to wet scrubber processes, typically a sodium or ammonium sorbent or reactant solution is cycled through a wet scrubber to react with the $SO_2$ in industrial plant or power plant flue gases and produce a sodium sulfite/sulfate solution at a temperature in the range of from 100°–150°F. This solution is passed into a single or multi-stage reaction tank which is generally maintained in the temperature range of from about 50°–300°F. at an acid pH, generally below about 5.5 and preferably in the range of below about 3.5.

A ferric sulfate or a ferrous sulfate material or solution may be charged into the reactor. The reaction may occur in the presence of air and/or bacterial activation as optional conditions. In the alternative, elemental iron in the form of high iron content ground water, scrap iron, steel furnace dust, iron-containing fly ash, iron wastes from local municipal incinertors, iron containing slag, iron pyrites from coal washings, mine waters containing iron, or industrial process waste waters containing iron may be used as the source of iron ($Fe^o$), ferric ion, or ferrous ion. In addition, a source of sulfuric acid, alone or in combination with the iron charge, is introduced to the reactor. Typical sources of the sulfuric acid include sulfuric acid from other pollution control processes such as are employed in smelter operations, industrial waste waters containing sulfuric acid, mine waters such as blackwater, or sulfuric acid from a side stream of the flue gases being treated. If sulfuric acid is employed, it may be of an extremely crude type or relatively low concentration. Pickle liquors or pyrite or gob dump leachate are good sources of both ferrous/ferric ion and sulfuric acid. Conversely the process of this invention may be used to dispose of such pollutants by reaction with $Na_2So_4$ or waste-sulfate cake.

The reaction is maintained in the tank for a time sufficient to produce the sodium or ammonium hydroxy ferric sulfate insoluble product which precipitates at the bottom of the tank, typically in 10 minutes to 7 days and preferably 10 minutes to 24 hours. Air may be bubbled through the reactor in order to promote the conversion of elemental iron to ferric ion and to promote bacterial activation of the reactions.

The tank may be operated abiotically, or, optionally can be charged with one or more bacterium of the type which oxidizes sulfur and iron. For example, one or more iron bacterium of the genus Thiobacillus (ferrooxidans, thiooxidans, concretivorous, neopolitanus, or thioparous), Ferribacillus ferrooxidans, or an acid-tolerant filamentous iron bacterium of the genus Metallogenium may be employed. Bacteria other than those mentioned may also be employed.

Generically, the compounds produced according to the instant process may be described as hydrous or anhydrous, insoluble basic hydroxy ferric sulfates, predominantly sodium or ammonium hydroxy ferric sulfates, or mixed sulfates which are represented by the formula:

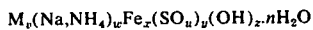
$$M_v(Na,NH_4)_w Fe_x(SO_u)_y(OH)_z \cdot nH_2O$$

wherein M is selected from an alkali metal other than sodium, or an authigenic metal (such as cobalt, magnesium, manganese, boron, titanium, calcium, copper, lead, zinc, arsenic, molybdenum, tin, antimony, selenium, gallium, vanadium, nickel, berrylium, zirconium, silver, tellurium, bismuth, mercury, strontium, barium, chromium, platinum, palladium, aluminum, or uranium) or other cation present in industrial or power plant wastes, $v$ is selected from zero to six, $w$ is selected from zero to five, $x$ is selected from zero to six, $u$ is 3 and/or 4, $y$ is selected from one to five, $z$ is selected from zero to 12, and $n$ is selected from zero to 20.

An analysis of the end products shows that they may be generally classified as sodium and/or ammonium hydroxy ferric sulfates or sulfites, and may be hydrated or anhydrous.

An analysis of the end products shows that they may be generally classified as insoluble, as compared to the standard in the industry, calcium sulfate: 2.3 g/l (R.T.). $CaSO_4$ has been taken as the standard in view of the fact that it is an end product sought to be produced by air pollution control processes involving contact in a liquid system of lime or limestone with flue gases containing $SO_x$. Calcium has been the material of choice, in spite of severe problems internal to the scrubbers, because of the relative insolubility of the end product calcium sulfate. The end products of this invention are 10 to 100 times less soluble generally than the calcium sulfate. This is a reduction in solubility of approximately $10^3$ to $10^4$ times as compared to the starting sodium sulfite/sulfate waste materials.

The end product may vary depending on the pH of the reaction tank or tanks. For example, Sideronatrite, $Na_2Fe(SO_4)_2OH \cdot 3H_2O$ and or Metasideronatrite $Na_4Fe_2(SO_4)_4(OH)_2 \cdot 3H_2O$, may be produced at a pH of below about 2.0, while Natrojarosite, $NaFe_3(SO_4)_2(OH)_6$, or ammoniojarosite, $NH_4Fe_3(SO_4)_2(OH)_6$, may be produced at a pH below about 4. Depegite $Na_5Fe_4(SO_3)_5(SO_4)_2(OH)_3 \cdot 3H_2O$, Rosarite $Na_2Fe(SO_3)_2OH \cdot 3H_2O$, and Iriite $NaFe_3(SO_3)_2(OH)_6$ may be produced at a pH between about 2.2 and 5.5.

The presence of other metal cations, such as Cu, Pb, Ag, Zn and the like naturally present in the waste waters, cake or liquors do not interfere. Indeed such metallic ions can be scavenged by coprecipitating with the above sodium or ammonium compounds as, for example, Argentojarosite, $AgFe_3(SO_4)_2(OH)_6$, Beaverite, $Pb(Cu,Fe,Al)_3(SO_4)_2(OH)_6$, Plumbojarosite $PbFe_6(SO_4)_4(OH)_{12}$, and the like.

The process of the present invention may be done at the industrial or power plant with iron and sulfuric acid provided, or the sodium or ammonium sulfite/sulfate cake or scrubber slurry can be transported to a special processing plant. Where the power plants are built close to coal mines, the acid mine water containing both the sulfuric acid and iron values may be piped to the power plant for reaction, with the resultant disposal of both cake and water pollutants.

The production of Sideronatrite is preferred over the production of Natrojarosite, since the Sideronatrite production requires one-sixth the amount of iron, only 66% of the acid (that is, one-third less), and results in disposing of six times the sulfate for an equal amount of iron, and three times the sulfate for an equal amount of acid required in the Natrojarosite process. However, process conditions for production of Sideronatrite can be more difficult than those for Natrojarosite production depending on the reactant feed types. Thus, the production of Natrojarosite might be preferred for a different set of operating conditions. Generally, the production of Sideronatrite requires conditions which are more acidic, the reaction is slower and the yield is generally less since a higher concentration of sodium and ferric ion is required in solutions for production of Sideronatrite as compared to the production of Natrojarosite or Ammoniojarosite. Conditions may also be adjusted to produce Sideronatrite alone, Sideronatrite in combination with Natrojarosite, Sideronatrite in a first stage followed by Natrojarosite in a second stage, Natrojarosite in a first stage followed by Sideronatrite, or Natrojarosite alone. Similarly Ammoniojarosite may be produced alone or in combination with the other insoluble precipitates. As noted above, the presence of other elemental species in an electronically neutral or ionic state can enter into the insolubilization reaction and produce a mixed product.

FIGURES

The detailed description which follows has reference to the drawings in which:

FIG. 1 is a schematic flow sheet of one embodiment of the process of the present invention as applied to industrial or power plant $SO_2$ removal processes utilizing a sodium or ammonium sorbent or reactant in either a wet or dry type process;

FIG. 2 is a schematic diagram of a multi-stage reactor for the process of the present invention;

FIG. 3 illustrates schematically still another embodiment of the process utilizing sidestream flash evaporation and/or concentration, and/or multiple bacterial activation; and FIG. 4 illustrates an embodiment of the process employing a feed prepared from a pyrites leach dump or waste pickle liquors, as illustrative of pre-prepared concentrated ferric ion, sulfuric acid and sodium or ammonium sulfate solutions fed to a single reactor.

DETAILED DESCRIPTION

The detailed description of the embodiments of this invention are by way of illustration and not by way of limitation of the present process.

Referring to FIG. 1, an industrial or power plant 1 employs fuel 2 to produce power or a product 3. By way of illustration, reference will be had herein to a stationary power plant employing coal as a fuel to produce power 3, and SO₂ and ash-containing flue gas 4 or 4', waste bottom ash or slag (not shown), and hot waste water 5. A typical industrual plant would be a copper smelter which would employ oil or natural gas in roasters, reverbatory furnaces, and/or converters to produce a copper product 3, waste slags, and dust and SO₂-containing off-gases 4 or 4'. Other examples include glass plants, paper plants, or manufacturing plants of all types.

The following description makes detailed reference to sodium systems but it should be understood that ammonium systems are equally adaptable to the present process.

The sodium sorbents contemplated herein include sodium hydroxide (spray driers and scrubbers only), soda ash of various grades, sodium carbonate, several hydrous and anhydrous types of sodium sesquicarbonate, Trona ($Na_2CO_3 \cdot NaHCO_3 \cdot 2H_2O$), sodium bicarbonate, Nahcolite ($NaHCO_3$), Wegscheiderite ($Na_2CO_3 \cdot 3NaHCO_3$), Thermonatrite ($Na_2CO_3 \cdot H_2O$), Natron ($Na_2CO_3 \cdot 10H_2O$), Dawsonite ($NaAlCO_3(OH)_2$), Eitelite ($Na_2CO_3 \cdot MgCO_3$), Shortite ($Na_2CO_3 \cdot 2CaCO_3$), Pirssonite ($Na_2CO_3 \cdot CaCO_3 \cdot 2H_2O$), Gaylussite ($Na_2CO_3 \cdot CaCO_3 \cdot 5H_2O$), Burbankite ($Na_2Ca_4(CO_3)_5$), Northupite ($Na_2Mg(CO_3)_2 \cdot NaCl$), Bradleyite ($Na_3MgCO_3PO_4$), Tychite ($Na_6Mg_2(CO_3)_4(SO_4)$), crude Trona-type brines from Seales Lake or Owens Lake, California, alkalized alumina, sodium sulfite, sodium bisulfite, and other authigenic sodium-containing minerals. Ammonia, ammonium hydroxide, ammonium sulfite, ammonium bisulfite and other currently used or proposed ammonium compounds are included herein as the ammonium-type sorbents. Mixtures of the additives are included.

In a first alternative, a powdered, dry sodium sorbent 6, such as Nahcolite or Trona, is charged into a dry SO₂ removal apparatus 7, such as a baghouse, fluidized bed reactor, cross-flow (dry) scrubber, fixed bed reactor, moving bed reactor, electrostatic precipitator, apitron (hybrid precipitator-fabric filter), tray reactor or the like. The sodium-type sorbent reacts with the SO₂ in the warm flue gas at a temperature in the range of from about 200°–1000° F.

For example the sodium sorbent may be crushed, crude Nahcolite Ore (90%, =200 mesh) which typically would have elemental, compositional and acid insoluble residue analyses (in weight percent) as follows.

Table I

| Nahcolite Analysis | |
|---|---|
| Elemental | |
| pH (1 gram in 100 ml H₂O) | 8.40 |
| Sodium (Na), % | 19.23 |
| Calcium (Ca), % | 2.67 |
| Magnesium (Mg), % | 0.80 |
| Carbonate (CO₃), % | 57.70 |
| Sulfate (SO₄), % | 0.02 |
| Nitrate (NO₃), % | 0.01 |
| Nitrite (NO₂), % | 0.0001 |
| Sulfite (SO₃), % | None |
| Acid insoluble, % | 17.9 |
| Acid insoluble at 550° C, % | — |
| Compositional Analysis | |
| Sodium bicarbonate (NaHCO₃), % | 70.0 |
| Sodium carbonate (Na₂CO₃), % | 0.0 |
| Magnesium carbonate (MgCO₃), % | 2.8 |
| Calcium carbonate (CaCO₃), % | 6.7 |
| Non-reactive material, % (acid insoluble + moisture) | 20.5 |
| Spectrographic Analysis of Acid Insoluble Residue Ignited at 550° C, % | |
| Sodium | 14. |

Table I-continued

| Nahcolite Analysis | |
|---|---|
| Potassium | 6.0 |
| Silicon | 17. |
| Aluminum | 6.7 |
| Iron | 0.97 |
| Magnesium | 0.20 |
| Boron | trace |
| Titanium | 0.39 |
| Calcium | 0.11 |
| Manganese | 0.015 |
| Gallium | 0.0045 |
| Molybdenum | 0.0056 |
| Vanadium | 0.0043 |
| Copper | 0.022 |
| Nickel | 0.0068 |
| Silver | 0.0028 |
| Zirconium | 0.0065 |
| Cobalt | 0.0022 |
| Strontium | 0.0058 |
| Chromium | 0.0059 |

For example, the reactor may be a baghouse, typically operating in the range of from about 250°–600° F., or higher, depending on the temperature limitations of the bag fabric. The sorbent, such as ground Nahcolite ore, is coated on the bags, and reacts with the sulfur trioxide and sulfur dioxide in the gas to produce sodium sulfate and/or sodium sulfite in the form of a cake (hereinafter called sulfate cake for simplicity), and which cake also contains residual fly ash. The reaction product sulfate cake 8 may contain other residual minerals besides sodium sulfate, sodium sulfite, sodium sulfide, sodium persulfate, sodium bisulfate, and sodium bisulfite due to the presence therein of reacted or unreacted species present in the original sodium-compound feed or fly ash. For example, in the case of Nahcolite ore, the predominant species would be calcium, magnesium and sodium carbonates (the latter derived from sodium bicarbonate in the SO₂ removal process by action of heat), silica and alumina, Dawsonite, potassium feldspar, calcite, kerogens (organics), iron and sulfur (organic and FeS₂).

The sulfur-containing salt produced by reaction of the SO₂ or particulates emissions containing flue gas (e.g. sulfate cake or scrubber liquor or sludge effluent) may be generically characterized as:

$$Q_aH_bSO_c,$$

wherein Q is Na, NH₄ or mixtures thereof, $a$ is 1 or 2, $b$ is 0 or 1, and $c$ is 0, 3 or 4, and mixtures thereof.

For a Nahcolite sorbent, typical baghouse sulfate dust cake analysis ranges are as follows:

Table II

| Baghouse Dust Cake Analysis | | | |
|---|---|---|---|
| | Elemental Analysis Range (11 tests, weight %) | | |
| pH (1:100 ml) | - | 8.15 | – | 8.58 |
| Sodium (Na), % | - | 20.22 | – | 21.88 |
| Calcium (Ca), % | - | 2.35 | – | 3.35 |
| Magnesium (Mg), % | - | 0.77 | – | 1.17 |
| Carbonate (CO₃), % | - | 14.60 | – | 33.09 |
| Sulfate (SO₄), % | - | 21.24 | – | 37.28 |
| Sulfite (SO₃), % | - | 0.60 | – | 1.18 |
| Nitrate (NO₃), % | - | 0.65 | – | 0.86 |
| Acid insoluble, % | - | 16.8 | – | 19.4 |
| | Combination Analysis Range (11 tests, weight %) | | |
| NaHCO₃ | - | 7.1 | – | 37.5 |
| Na₂CO₃ | - | 0.0 | – | 3.6 |
| Na₂SO₄ | - | 28.0 | – | 54.6 |
| NaHSO₄ | - | 0.0 | – | 4.4 |
| NaHSO₃ | - | 0.8 | – | 1.6 |
| NaNO₃ | - | 0.8 | – | 1.0 |

Table II-continued

| Baghouse Dust Cake Analysis | | |
|---|---|---|
| $MgCO_3$ | - 2.5 - | 4.0 |
| $CaCO_3$ | - 5.9 - | 8.4 |

This sulfate cake 8 is transferred to mixing tank 9 where its solubles are dissolved, preferably with the aid of agitation means 10 to form an aqueous solution which is predominantly sodium sulfate. The solvent is water from any source, and heat and/or air 14 may be employed to assist the dissolution, and to convert sulfite to sulfate, if need be.

In a preferred embodiment, this water source is polluted, hot effluent water from the ash tank located beneath the boiler furnace. Optionally, heated hydrobin water may be employed. In a typical power plant, the molten or hot slag (bottom ash) descends through an aperture in the bottom of the furnace into a tank of water called an ash tank. The bottom ash or slag normally has a temperature on the order of 2000°–3000° F. which imparts its heat to the water in the ash tank upon cooling. At the same time, the water leaches and/or suspends substantial portions of dissolved solids and particulate matter. The hot, waste leachate water thus poses a pollution disposal problem since it contains dissolved and undissolved solids in excess of limits permitted by currently pending codes.

This hot waste water 5 ordinarily has a temperature on the order of 100°–500° F., more preferably in the range of 100°–200° F., and may be piped to the mixing tank 9 to provide the solvent medium for the sulfate cake. Both the sulfate cake and the waste water contain insolubles such as calcium and magnesium sulfates, silica, alumina, and other materials (such as fly ash and bottom ash insolubles) which are collected in the cake or suspended in the waste water, as the case may be. These insoluble materials are collected in the bottom of the mixing tank and removed as an underflow 12 which may be pumped as a sludge directly to a sludge pond, or washed, dewatered, and/or dried and disposed of in a simple landfill via line 13.

As above noted, the liquor from mixing tank 9 comprises a sodium sulfate and/or sulfite solution which is delivered to settler-clarifier tank 11 via line 15 at a temperature on the order of 50°–200° F. Tank 11 is a settler and/or clarifier which may be a single tank, a multi-stage tank or a plurality of tanks depending on the amount of solids still remaining undissolved in the sodium sulfate solution. Where mixing tank 9 is designed with a settling portion, settler 11 may optionally be omitted with sodium sulfate solution being transferred directly to reaction tank 17. The solids still remaining in solution 18 in tank 11 settle out and are removed by underflow 19 which may be treated in the same manner as the underflow 12 from the mixing tank 9. Typically, the underflows from mixing tank 9 and settler-clarifier 11 may be combined, washed, and dewatered before landfilling or other disposal. The liquor from settler-clarifier tank 11 comprises a sodium sulfate solution 16 which is transferred to reactor 17.

As used herein, dewatering underflow may comprise the use of filters, decanting in sludge ponds, centrifuges, screens, and the like. The filtrate or sludge pond overflow may be recycled in the system where desired, e.g. to condensate recycle line 26, or optionally to the hot waste water line 5, to wet scrubber effluent line 15', or to the overflow 16 from settler-clarifier 11, or used in washing the precipitate.

It should be understood that reactor 17 may be a single or multi-stage reactor tank, or a plurality of tanks depending on the optimum operation of the process. While the input from line 16 is described as a sodium sulfite/sulfate solution, it should be understood that it may also be a bisulfate, bisulfite, persulfate, persulfite, or mixed solution. In addition, it may contain other dissolved or ionic species carried in true solution, emulsion, partial solution or the like through the system to the tank 17. Into tank 17 are charged the remaining reactants including a source of sulfuric acid 20, and a source of iron 21. Optionally, bacteria for activation and catalysis of the several reactions occurring in tank 17 may be supplied via 22. Air for biotic or abiotic oxidation is supplied through line 23. Both heat and sulfuric acid can be supplied to tank 17 by sparging therein a slipstream from the power plant flue gas, which also may contain enough $CO_2$ for biotic requirements.

As the result of the reactions, gaseous hydrogen may be released through line 24. Any hydrogen released may be burned to provide heat to the reaction, clarifying, or mixing tanks. The reaction occurs at a temperature in the range of from 50°–300° F., preferably 120°–180° F., an acid pH, preferably below about 5.5, for a time sufficient to form the sodium or ammonium hydroxy ferric sulfate or sulfite compounds which precipitate. The generally crystalline, easily filterable precipitates are withdrawn as an underflow via line 28, dewatered and/or dried before disposal as an insoluble product in a simple landfill. Typically, the fill site for the product does not require extensive preparation to prevent leachate leaking therefrom, or daily coverage to prevent dissolution due to ambient rainfall. In the alternative, the insoluble sodium or ammonium hydroxy ferric sulfate compounds or their analogues, produced in the process may be used as roadbed fill, concrete aggregate or the like.

In one important embodiment, the sulfuric acid charged is sulfuric acid produced by other pollutant control processes such as scrubber production of sulfuric acid from power plant or smelter off-gases, the latter from roasters, reverbatory furnaces, and convertors. As the result of current sulfuric acid production, and proposed sulfuric acid production from other types of $SO_2$ emission control processes, there is currently available sulfuric acid in excess of that needed in the chemical industry. Thus, the instant pollution control process provides for simultaneous disposal of hot, polluted waste ash tank water, sulfate cake, sulfate scrubber wastes, and sulfuric acid wastes from other industrial and $SO_2$ control processes. It should be noted in this connection that the sulfuric acid required need not be particularly pure or highly concentrated.

Similarly the iron charge may be from any suitable source and includes high iron content ground or well water, low grade scrap iron, steel furnace dust, iron wastes from local municipal incinerators, iron-containing slag, iron-containing waste waters which may be natural or industrial process waste waters, acid mine waters, black water, "gob," "slag," or "slate" type iron pyrites from coal washings, pickle liquors, and the like. The latter two, pickle liquors and iron pyrites from coal washings are described in more detail below with respect to FIG. 4.

Still another suitable source of iron would be the bottom ash or fly ash from the power or industrial plant depending on the iron content of these ashes or or slags as shown by assays. The abrasive action of fly ash on the boiler tubes wears the tubes out, in some cases in a matter of months, and this iron is retained in the ash and can supply substantial amounts of iron in addition to the natural iron contained normally in fly ash.

The iron is preferred to be in the ferric ion form when delivered to the reactor 17. Where, however, the iron is available primarily or only as $Fe^o$ or ferrous ion, the process contemplates both abiotic iron oxidation and biotic oxidation with one or more bacteria of the genus Thiobacillus (ferrooxidans, thiooxidans, concretivorous, neopolitanus, or thioparus), the genus Ferribacillus (such as ferrooxidans), and acid-tolerant filamentous iron bacterium of the genus Metallogenium. The abiotic ferrous iron oxidation is directly dependent on the pH above 4.5, indirectly pH dependent between 3.5 and 4.5 and is relatively constant below a pH of 3.5. In general, abiotic ferrous iron oxidation is slower at a lower pH. For example, abiotic oxidation is approximately 8,200 times slower at a pH of 3.5 than at a pH of 5.5.

In the overall pollution control process utilizing a sodium or ammonium type absorbent or reactant, the sorbent or reactant ordinarily starts in the process in the baghouse or scrubber at an alkaline pH ranging from a low of about 8.3 for sodium bicarbonate or Nahcolite up to about 12–14 for sodium hydroxide. As a result of the contact and reaction with $SO_2$, the pH may be reduced to the neutral or mesoacidic range. In the mesoacidic pH range of about 3.5 to 6.5, the Metallogenium bacterium and its heterotrophs are particularly suitable for iron or pyrite oxidation and degradation. As a result of the activity of the Metallogenium on the iron and sulfur present in the solution, the pH drops into the 3–4.0 range. The Metallogenium grows in multi-branching colonies of interweaving ferric iron-encrusted stalks having a diameter of 0.1 to 0.4 microns. The stalks are characterized as not having a conventional cell body. The upper tolerance of the Metallogenium is approximately 150 micrograms per liter of ferrous iron produced as a result of the oxidation of elemental iron.

As the pH decreases and ferrous ion concentration increases, the activity of the Metallogenium bacterium is self limiting, and conditions become more nearly conducive for activity of the Thiobacillus ferrooxidans which has an optimal activity below a pH of 3.5. The latter bacterium completes the ferrous to ferric ion oxidation and brings the pH down to around the 1.5 to 2.5 range. Where required, a source of carbon dioxide and nitrogen, typically in the form of ammonium, may be supplied to the bacterium medium to support growth. The resulting biotically-produced ferric ion solution, rich in sulfuric acid, may then be provided to the reaction tank 17 as above described in detail.

Referring again particularly to FIG. 1, as an important alternative embodiment in the process of the present invention, the industrial or power plant 1 may employ a sodium or ammonium alkaline sorbent, provided dry or as a sorbent solution 6' to a wet scrubber 7' wherein the sorbent in solution reacts with $SO_2$ contained in the flue gas 4' to produce a sodium or ammonium sulfite/sulfate solution. This solution also may contain trapped fly ash and is forwarded to the settler-clarifier 11 by way of line 15'. The overflow liquor, being predominantly a sodium or ammonium sulfate solution, is transferred via line 16 to the reactor 17, with precipitation of the insoluble product as above-described. Water vapor is removed from the reactor via line 25 and condensed, to be either recycled to the plant 1 via line 26 or disposed of to natural sources via line 27.

Thus the process of this invention makes both wet and dry sodium and ammonium alkali-type $SO_2$ removal systems available technology since the wastes from either the wet or dry system can be insolubilized in accordance with the present process.

Referring now more particularly to FIG. 2, this embodiment shows a plural reactor system which may be operated abiotically or biotically.

The ammonium or sodium sulfate solution is transferred to first reactor 171 via line 16. The required sulfuric acid charge or make-up solution may be added through line 20 with the iron source charge added through line 21. Hydrogen gas, if any, and condensate may be removed via lines 24 and 25 as above described. Condensate may be used as the fresh water source 46 for washing the precipitate (FIG. 3).

The first stage reaction tank 171 is maintained at a pH below about 5.5 and above about 2.0 at a temperature in the range of 50°–300° F. The temperature range is preferably maintained at 120°–180° F. in the case of abiotic operation, and in the range of from about 75°–130° F. in the case of biotic operation. In the case of biotic operation, it is preferred to maintain the species Metallogenium in the first reactor tank to assist in the oxidation of the iron to ferrous ion. Air and/or bacteria with any required nutrients may be supplied through line 30 as required to assist in the oxidation. At the pH range and temperature range maintained in reactor 171, the predominant precipitates will be Natrojarosite and/or Ammoniojarosite. These are removed through line 31 to landfill as above described.

A middling or overflow liquor is removed from reactor 171 via line 29 and transferred to reactor 271. Any sulfuric acid required for make-up is introduced through line 20', and iron through line 21'. Air and/or bacteria with any required nutrients to assist in oxidation of ferrous to ferric ion is introduced through line 30'. Condensate may be removed from line 25', and hydrogen, if any, from line 24'. The second stage reaction in reactor 271 is maintained generally at a pH below about 2.5 at a temperature in the range of from 50°–300° F., with the preferred temperature ranges for abiotic and biotic being as above stated for reactor 171.

As the pH drops into the 1.5 range in reactor 271, the predominant precipitate will be Sideronatrite. As the pH drops still further to the range of 0, Ferrinatrite will precipitate. These latter two precipitates may be withdrawn via line 32 and forwarded to landfill as above described. The Ferrinatrite precipitate is generally water soluble, but on standing in moist air can convert to Sideronatrite. Thus where the pH gets down below the preferred 1.0 range and Ferrinatrite is formed, the underflow may be washed in water or let stand damp to either remove the Ferrinatrite or convert it to Sideronatrite insoluble precipitate.

The preferred pH range for the production of Natrojarosite or Ammoniojarosite is in the range of 1.8 to 2.5, 1.5 to 2.0 for Sideronatrite, and 0–1.0 for Ferrinatrite. The ferric ion for all these compounds preferably should be present in a concentration on the order of about 4 grams per liter or above. Excess alkalinity and oxygen should be avoided, since these conditions promote oxidation of iron to iron hydroxide compounds such as $Fe(OH)_2$, $Fe(OH)_3$, or $FeOOH$, which reduce ferrous and ferric ion availability without bringing down sodium and sulfate ions. Further, such hydroxides are gelatinous precipitates which are difficult to separate, dewater or dry.

An important aspect of this invention is the ability to operate at moderately acidic pH's and at low ferric ion concentrations, thereby reducing iron and acid requirements, while pulling down high quantities of sodium and sulfate ions. Operation at moderately acid, oxygenated conditions is made difficult by the relatively easy formation of $Fe(OH)_2$, $Fe(OH)_3$ and $FeOOH$ at such conditions. While these hydroxides are insoluble, the point is not to remove $Fe^{+3}$ from the solution, but to use $Fe^{+3}$ to insolubilize the $Na_2SO_4$. This is aggravated by the fact that it would be easier and cheaper to operate at higher pH's, since less acid would be required, yet the ferrous/ferric hydroxides production is more rapid and complete at such pH values.

The insoluble precipitates of this invention may be selectively produced in the ferrous/ferric hydroxides pH range to the substantial exclusion of such hydroxides by starting the Sideronitrate Natrojarosite, Ammoniojarosite, etc., precipitation at high $Fe^{+3}$, $Na^{+1}$, $SO_4^{-2}$ concentrations and low pH to suppress ferrous/ferric hydroxides precipitation. This is followed by gradually permitting the pH to rise and the ferric ion concentration to fall. The Sideronatrite, and $NH_4$/Na-jarosites precipitation may thus be extended with good yields into the pH regions where typically one would expect ferrous/ferric hydroxide precipitation to predominate, yet only a minor proportion of those hydroxides form. In the alternative, a low ferric ion concentration, low pH solution may be seeded with Sideronatrite or $NH_4$/Na-jarosite crystals, and thereafter the pH adjusted to the higher range without substantial yield interference by the $Fe^{+2}/Fe^{+3}$ hydroxides.

To speed the precipitation, and the recycle of condensate water to the power or industrial plant, a portion of the reaction solution in tank 17, or multiple tanks 171 and 271, may be removed and concentrated or evaporated. This is shown in more detail in FIG. 3. The sodium or ammonium sulfate solution, sulfuric acid charge and an iron charge are introduced through lines 16, 20 and 21 as before into reactor 171. Air or bacteria with any required nutrients may be optionally introduced through line 30 as above described. Where bacteria is used, the pH is preferably kept below 5.5 and the temperature is kept in the range of 70°–130° F. Precipitates or insolubles may be withdrawn as underflow 31, dewatered, or optionally rinsed, dried, and passed to a landfill. Part or all of the rinse water may be passed through an ion exchanger to remove residual sodium or acid values, and the exchanger backwashs wastes recycled to the reaction tanks 171, 271 and 371.

A middling liquor is withdrawn from tank 171 via line 29 and passed to tank 271 for second stage reaction at a pH of below about 2.5 and a temperature of from 70°–130° F. As above described, sulfuric acid make-up, iron make-up and air and/or bacterial may be introduced through lines 20', 21' and 30'. Precipitant and insolubles underflow are removed via line 32 and passed to a landfill after optional washing as described above.

A midding liquor from tank 171 is withdrawn via line 40 and passed to a concentrator or evaporator 41 which may be maintained at a temperature of between about 120°–250° F. Condensate water is withdrawn from the concentrator or/evaporator via line 25 and returned to the industrial or power plant 1, the wet scrubber 7', the mixing tank 9, or may be disposed of via line 27 (see FIG. 1). These increased temperatures tend to promote the precipitation of the Natrojarosite since the solution in the concentrator or evaporator 41 will tend to be relatively concentrated in terms of both sodium and ferric ion. Heat may be provided as required via line 42. The precipitate is withdrawn via line 31'.

Similarly, a middling liquor may be withdrawn from reactor tank 271 via line 43 and passed to a second concentrator or evaporator 44. In the alternative, concentrator or evaporator 44 may be second or subsequent stage of the concentrator or evaporator 41. As with the concentrator 41, a condensate is withdrawn via line 25' and heat may be provided via line 42'. The temperature is maintained as above in the range of from 120°–250° F., in order to precipitate Sideronatrite and/or Natrojarosite. For the precipitation, the ferric ion concentration may initially be maintained high, for example, above about 35–50 grams per liter, in the concentrator or evaporator 44, thereafter let drop as precipitate forms, and then maintain the lower concentration, e.g. at 0.2–10 g/l. Likewise, the pH may be initially kept in the range of from 1 to about 1.5 and thereafter adjusted to the 1.5–4.5 range. The precipitate may be withdrawn directly via line 32' and passed to dewatering, and/or drying operations, and thereafter landfill.

In the alternative, a portion of the underflow 45 from reactor 44 may be withdrawn via line 45 and washed with water via line 46 to produce a clean precipitate in line 60 before landfilling. Wash water in line 47 may be purified by ion exchange and recycled to tank 271 as above described. This same washing procedure is not shown for the precipitate underflow from concentrator or evaporator 41, but it should be understood to be an available alternative.

Where desired, a portion of the liquors in the concentrators 41 and 44 may be recycled to their respective tanks 171 and 271 via lines 48 and 49. In the case of the concentrator or evaporator 41, the recycle stream 48 may also be delivered directly to tank 271 via line 50.

The embodiment of FIG. 3 need not be limited to a plural tank reactor stage 171 and 271. It should be understood that a concentrator or flash evaporator may be employed in conjunction with the single reactor 17 as shown in FIG. 1.

However, the embodiment of FIG. 3 does assist in separating the precipitation conditions from the ferric ion production stage, particularly in the case of the biotic oxidation. The bacterial operation occurs in the range of from about 70°–130° F., optimally around 95° F., which may be maintained in both stages 171 and 271 apart from the optimum precipitation conditions on the order of 120°–250° F. in the evaporators 41 and 44. The higher end of the temperature range, from 190°–250° F., may be maintained in other portions or stages of the concentrator or evaporators 41 and 44 in order to flash water therefrom.

Still further, and referring again to FIG. 3, it can be seen that a line 161 optionally may be employed to deliver sodium or ammonium sulfate directly to the concentrator or evaporator in place of the delivery line 16 directly to the first stage reaction tank 171. Similarly a concentrated sodium or ammonium sulfate solution may be supplied through line 261 to the concentrator 44 rather than through lines 16' and/or 29 to reactor 271. This permits the biotic or abiotic preparation of the ferric ion in reactors 171 and 271 without the precipitation of the Natrojarosite, Ammoniojarosite or Sideronatrite. Subsequently, in this embodiment, the formation of the insoluble precipitate occurs separately, or in concentrators or evaporators 41 and 44, from ferric ion formation in reactors 171 and 271.

Referring now to FIG. 4, this figure illustrates an embodiment utilizing a pyrites or fly ash leachate as a source of both sulfuric acid and ferric ion. Pyrites leachate is particularly suitable since the instant process provides for disposal of the pyrites leachate which otherwise would pose a pollution problem. At present, a typical coal containing from 2–6% sulfur may have removed therefrom by washing at the mine or at the power plant approximately 0.5% sulfur in the form of pyritic sulfur. The resulting iron pyrite material is ordinarily disposed of in a mine dump. Over a period of years, however, the iron pyrites may be abiotically or bacterially oxidized to form ferrous and ferric ion, and dilute sulfuric acid from the sulfur contained therein. The resulting mine waste water is a pollutant.

Indeed, both the sulfuric acid and iron content required for the present process can be provided from waste mine water since it typically contains a dilute sulfuric acid and ferrous or ferric ion content. For example, mine waters ordinarily contain about 300 milligrams per liter total iron cotent and may have a pH below about 5.5, typically on the order of 2.0 to 4.0. Where necessary, these mine waters may be concentrated, as by evaporation, before charging to reactor tank 317.

A pyrites dump 501 has water 51 distributed therethrough by a series of channels 52, 53, 54. In the alternative, the dump may comprise a mixture of coal-washings pyrite and low-grade iron scrap. Bacteria in the dump produce a pregnant liquor 55 which is rich in ferrous ion, ferric ion, and sulfuric acid. This is provided via line 56 to reactor 317. Likewise, such liquors may have to be concentrated prior to use.

In the alternative, an otherwise preprepared concentrated solution of ferric ion and/or sulfuric acid is provided through line 57. A typical source of the preprepared concentrated solution in line 57 would be a waste pickle liquor from steel manufacture. For example, a typical pickle liquor has a composition 87.1% $H_2O$, 4.6% free $H_2SO_4$ (0.94 molar; pH about 0.1), and 8.3% $FeSO_4$ (30.6 g/l).

In addition a concentrated sodium or ammonium sulfate solution is provided through line 16 to the reactor 317. Any make-up acid or iron may be added through lines 20 and 21 as required. Likewise, heat (e.g. steam), if required, may be added through line 58. $SO_x$-containing flue gas sparged in solution serves to add both heat and acid. Condensate may be withdrawn from the reactor via line 25. Where hydrogen is produced, it may be withdrawn via line 24. Normally, in the case of a preprepared concentrated ferric and/or sulfuric acid solution with the reaction in reactors 317 occurring abiotically, hydrogen tends not to be produced.

The reactor 317, with or without a flash evaporator as shown in FIG. 3, may be maintained at a pH below about 4.0 and a temperature in the range of from about 70°–300°F. The precipitate or precipitates may be withdrawn via underflow line 28 and dewatered and/or dried before passing to landfill.

It should be understood that the preprepared concentrate solutions embodiment of the process may also be applied to plural reactors as shown to the right in FIG. 2 wherein the sulfuric acid and iron charge lines 20 and 21 are shown as at 59 to be potentially derived from steel manufacture pickle liquor or a pyrites-scrap iron dump leachate solution.

EXAMPLES:

By way of specific examples, Sideronatrite, Metasideronatrite, Natrojarosite and Ammoniojarosite have each been prepared within the temperature and pH conditions above-described employing sodium or ammonium sulfate solutions, such as from scrubber wastes or dissolved baghouse sulfate cake, ferric sulfate solution and sulfuric acid solutions. As shown below in Table III, good yield is obtained at the conditions described above herein, at temperatures on the order of below about 130° F.

Table III

Precipitant Formation

| Example No. | Solution Components (as Ions) | | | | | | Molar Ratio Na/Fe | pH | Precipitate Formed |
|---|---|---|---|---|---|---|---|---|---|
| | Grams/Liter | | | Moles/Liter | | | | | |
| | $Fe^{+3}$ | $Na^{+1}$ | $SO_4^{-2}$ | $Fe^{+3}$ | $Na^{+1}$ | $SO_4^{-2}$ | | | |
| 1. | 9.30 | 3.93 | 32.02 | 0.167 | 0.167 | 0.333 | 1.0 | 1.85 | Natrojarosite |
| 2. | 7.97 | 5.06 | 30.88 | 0.143 | 0.214 | 0.321 | 1.5 | 1.95 | Natrojarosite |
| 3. | 6.98 | 5.90 | 30.02 | 0.125 | 0.250 | 0.313 | 2.0 | 2.03 | Natrojarosite |
| 4. | 4.65 | 7.87 | 28.02 | 0.083 | 0.333 | 0.292 | 4.0 | 2.20 | Natrojarosite |
| 5. | 4.65 | 10.23 | 28.03 | 0.083 | 0.454 | 0.292 | 5.33 | 2.20 | Natrojarosite |
| 6. | 35.46 | 129.56 | 362.06 | 0.635 | 5.63 | 3.769 | 8.86 | 1.55 | Sideronatrite |
| 7. | 46.50 | 78.67 | 280.18 | 0.083 | 3.33 | 2.917 | 4.0 | 1.0 | Sideronatrite & Metasideronatrite |
| 8. | 46.50 | 78.67 | 280.18 | 0.083 | 3.33 | 2.917 | 4.0 | 0.0 | Ferrinatrite |
| 9. | 4.65 | 50.35 | 114.47 | 0.083 | 2.133 | 1.192 | 25.60 | 2.60 | Sideronatrite & Metasideronatrite |
| 10. | 4.65 | 25.17 | 63.24 | 0.083 | 1.067 | 0.658 | 12.80 | 2.80 | Natrojarosite & Goethite[1] |
| 11. | 4.65 | 50.35 | 114.47 | 0.083 | 2.133 | 1.192 | 25.60 | 2.80 | Natrojarosite & Goethite[1] |
| 12. | 4.65 | 50.35 | 114.47 | 0.083 | 2.133 | 1.192 | 25.60 | 2.55 | Natrojarosite/ Sideronatrite |
| 13. | 4.65 | 50.35 | 114.47 | 0.083 | 2.133 | 1.192 | 25.60 | 2.70 | Sideronatrite/ Natrojarosite |
| 14. | 4.65 | 50.35 | 114.47 | 0.083 | 2.133 | 1.192 | 25.60 | 2.5 | Sideronatrite |
| 15. | 4.65 | 0.90[2] | 28.018 | 0.083 | .05[2] | .292 | 4.0[2] | 2.2 | Ammoniojarosite |

Table III-continued

| | | | | | | | | | |
|---|---|---|---|---|---|---|---|---|---|
| | | Precipitant Formation | | | | | | | |
| | | Solution Components (as Ions) | | | | | Molar Ratio | | |
| Example No. | Grams/Liter | | | Moles/Liter | | | Na/Fe | pH | Precipitate Formed |
| | $Fe^{+3}$ | $Na^{+1}$ | $SO_4^{-2}$ | $Fe^{+3}$ | $Na^{+1}$ | $SO_4^{-2}$ | | | |
| 16. | 22.50[3] | 78.67 | 250.2 | 0.833[3] | 3.33 | 2.92 | 4.0[3] | 3.51 | Natroalunite |

[1] FeOOH
[2] Ammonium in this example rather than sodium to produce Ammoniojarosite
[3] Aluminum in this example rather than iron to produce Natroalunite, $NaAl_3(SO_4)_2(OH)_6$ In the above examples of precipitate formation conditions, Examples 1–4 represent typical leach liquor concentrations of ferric iron and sulfate, such as from pyrites dump or copper leach dump spent liquor. Example 5 represents typical concentrations of sodium and sulfur oxides (sulfate/sulfite), for example, from the Nahcolite Ore dry baghouse injection process described above. Example 6 confirms formation of Sideronatrite at very high iron, sodium, and sulfate concentrations. Examples 7 and 8 represent typical waste steel pickling liquors as a source of ferric iron and sulfate from which Sideronatrite and Metasideronatrite may be formed. Example 9 approximates concentrations of wastes from $Na_2CO_3$ or sulfite/bisulfite $SO_x$ emissions control wet scrubbing process. Example 15 shows formation of Ammoniojarosite, as from an ammonia-containing sorbent utilizing $SO_x$ scrubber waste liquor. Example 16 shows production of Natroalunite when aluminum is used in place of iron. Use of aluminum rather than iron may be an important consideration where sources of aluminum ion, as by acidic leaching of fly ash, are more readily chemically available than iron. Natroalunite can also be produced at an $Na^+/Al^{+3}$ ratio of 25:60 and pH of 3.99. Mixed Natroalunite-Thenardite precipitate is produced at the Example 16 conditions where the pH is > 4.3. The Natroalunite precipitate tends to be crystalline, but more difficult to filter; it may act as a binder or coating for the ferric precipitates or sodium sulfate, or for an insoluble coating formed or applied over a pellet or briquette of sulfate cake or sodium sulfur oxides.

Specific examples of $SO_x$ emissions control wet scrubber waste liquors containing sodium sulfur oxides are set forth below:

EXAMPLE 17

A sample of a purge stream from the evaporator of a sulfite/bisulfite $SO_x$ emissions control wet scrubbing system (Wellman-Lord) contained a supernatant and solids slurry, the latter reported as the following:

| Slurry Component | Amount (weight %) |
|---|---|
| $Na_2SO_3$ | 34.0 |
| $NaHSO_3$ | 20.0 |
| $Na_2SO_4$ | 18.0 |
| $H_2O$ | 28.0 |
| TOTAL | 100.0 |

The supernatant had a pH of 5.64 and an estimated 25 weight % dissolved solids in the same proportion as the slurry:

| Supernatant Component | Amount (weight %) |
|---|---|
| $Na_2SO_3$ | 12.0 |
| $NaHSO_3$ | 7.0 |
| $Na_2SO_4$ | 6.0 |
| $H_2O$ | 75.0 |
| Total | 100.0 |

To 100 ml of purge stream, saturated with the above sulfite and sulfate components, was added 50 ml of a 0.125 molar $Fe_2(SO_4)_3$ solution. The mole ratio of Na/Fe in this active solution was about 27.0. The pH dropped to 5.40 upon addition of the ferric sulfate solution, and was adjusted to 2.50 with concentrated $H_2SO_4$. This reaction mix was heated at 140°F for 2 days. Immediately after pH lowering to 2.5, a light brown precipitate began to form, which precipitate exhibited long crystalline, almost fibrous, needles. Upon analysis, the mole ratio of the Na/Fe in the precipitate was about 0.5. The precipitate was termed Depegite, proved insoluble, and was analyzed as having the following weight percent composition: 11 Na, 19.6 Fe, 17.6 $SO_4$, 36.0 $SO_3$, and 5.3 $H_2O$. The empirical formula of Depegite which closely approximates $Na_5Fe_4(SO_3)_5(SO_4)_2(OH)_3 \cdot 3H_2O$. Upon further analysis, Depegite is thought to be a cocrystallizate or mix of about 30 weight % Sideronatrite $Na_2Fe(SO_4)_2OH \cdot 3H_2O$, and two new compounds 30% Rosarite $Na_2Fe(SO_3)_2OH \cdot 3H_2O$, and 40% Iriite $NaFe_3(SO_3)_2(OH)_6$. Rosarite and Iriite appear to be sulfite analogs of Sideronatrite $Na_2Fe(SO_4)_2OH \cdot 3H_2O$, and Natrojarosite $NaFe_3(SO_4)_2(OH)_6$ respectively. The sodium values in the purge stream represent about 17% of the total sodium input into the system.

EXAMPLES 18–23

The above Example 17 was repeated at pH's varying from 5.0 down to 0.0 in increments of 1 pH unit (identified as Examples 18, 19, 20, 21, 22 and 23). Precipitates formed at pH's of 5.0, 4.0 and 3.0, but not at 2.0, 1.0 and 0.0. At pH 5.0 the precipitate was the same as in Example 17. At the lower pH's, $SO_2$ was liberated from the supernate, presumably because of the conversion of $NaHSO_3$ to $Na_2SO_4$ by reaction with $H_2SO_4$:

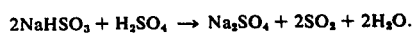

$$2NaHSO_3 + H_2SO_4 \rightarrow Na_2SO_4 + 2SO_2 + 2H_2O.$$

At $Na^+$ to $Fe^{+3}$ ratios of about 3.0, Goethite was preferentially formed at pH 0.0 to 2.6.

EXAMPLE 24

A sample of waste liquor from the main contacting chamber of a wet scrubber using $Na_2CO_3$ as the $SO_x$ sorbent contained predominantly $Na_2SO_3$ with some $NaHSO_3$, $Na_2SO_4$, $NaHSO_4$ and a little unreacted $Na_2CO_3$. The specific gravity of the solution was determined as 1.093. To 100 ml of this solution was added 50 ml of 0.125 molar $Fe_2(SO_4)_3$ with the resultant pH being 2.23. No pH adjustment was required. The solution was heated for 49 hours at 140°F, with a bright yellow, easily dewaterable granular crystalline precipitate being formed. The precipitate was washed twice with distilled water at room temperature and centrifuged. The wash water was clean both times, indicating insolubility. On analysis, the precipitate was found to be Natrojarosite. Yield and quality of the precipitate were excellent.

The solubility at room temperature at the end product Sideronatrite is 0.16g/liter based on the iron analysis and 0.55 g/l based on sodium analysis. The solubility of the end product Natrojarosite is 0.02 g/l based on the iron analysis and 0.37 g/l based on sodium. The iron analysis is considered more reliable because of the difficulty of washing entrained sodium ion from the precipitate. These compare favorably to the following reported solubilities:

Table V

| Component | Relative Solubilities Solubility & Conditions |
|---|---|
| Anhydrous $Na_2SO_4$ | |
| Monoclinic columnar | 488g/l at 40°C |
| Rhombic (Thenardite) | 427g/l at 100°C; 47.6g/l at 0°C |
| $Na_2SO_4.10H_2O$ (Glaubers Salt) | 110g/l at 0°C |
| $Na_2SO_4.7H_2O$ | 195g/l at 0°C |
| $Na_2SO_3.7H_2O$ | 328g/l at 0°C |
| $Na_2SO_3$ anhydrous | 125.4g/l at 0°C |
| $CaSO_4.2H_2O$ | 2.3g/l at R.T. |
| $CaSO_3.2H_2O$ | .043g/l at R.T. |
| $MgSO_4.7H_2O$ | 710g/l |
| Sideronatrite (based on Fe) | .16g/l at R.T. |
| Natrojarosite (based on Fe) | .02g/l at R.T. |
| Ammoniojarosite (based on Fe) | .009g/l at R.T. |
| Natroalunite (based on Al) | 0.16g/l at R.T. |

By comparing the overall reactions for the production of Natrojarosite:

$$6Fe^o + 6H_2SO_4 \rightarrow 6FeSO_4 + 3H_2 \quad (1)$$

$$6FeSO_4 + 3H_2SO_4 + 3/2 O_2 \rightarrow 3Fe_2(SO_4)_3 + 3H_2O \quad (2)$$

$$3Fe_2(SO_4)_3 + Na_2SO_4 + 12H_2O \rightarrow 2NaFe_3(SO_4)_2(OH)_6 + 6H_2SO_4 \quad (3)$$

Natrojarosite — Recycled with the overall reactions for the production of Sideronatrite:

$$2Fe^o + 2H_2SO_4 \rightarrow 2FeSO_4 + H_2 \quad (4)$$

$$2FeSO_4 + H_2SO_4 + \tfrac{1}{2}O_2 \rightarrow Fe_2(SO_4)_3 + H_2O \quad (5)$$

$$Fe_2(SO_4)_3 + 2Na_2SO_4 + 8H_2O \rightarrow 2Na_2Fe(SO_4)_2OH \cdot 3H_2O + H_2O + H_2SO_4 \quad (6)$$

Sideronatrite — Recycled it can be seen that the overall can factor (the ratio of elemental iron required to sodium ion removed), the acid balance (the amount of sulfuric acid produced minus the amount required), the acid factor (the ratio of sulfuric acid required to elemental iron required), and the iron factor (the ratio of elemental iron required to sodium sulfate disposed of), are each better for Sideronatrite than for Natrojarosite. In Natrojarosite, the can factor is 3 whereas for Sideronatrite the factor is 0.5, with the lower the factor number the better the operation. Likewise, only two moles of acid are needed in the production of Sideronatrite as compared to three moles required in the production of Natrojarosite. Likewise the acid factor in Sideronatrite is 1.0 whereas the factor for Natrojarosite is 3.0. The iron factor of Natrojarosite is 6 whereas for Sideronatrite the factor is only 1. Both the acid factor and iron factor (twice the can factor) give a feel for how much raw material in terms of sulfuric acid and scrap are required to remove the sodium sulfate and thereby insolubilize it. The lower these factors, the cheaper the process tends to be, depending on availability of iron and sulfuric acid sources. Offsetting this is the difficulty of the reaction to produce Sideronatrite at the more acid pH, but this can be ameliorated as noted by concentration and pH control or seeding, during processing.

The pyrite oxidation, or two stage pyrite degradation, which occurs in the pyrites or pyrites-iron scrap dump may be represented by equations 7, 8 and 9 as follows:

Pyrite Oxidation:

$$FeS + 7/2 O_2 + H_2O \rightarrow Fe^{+2} + 2SO_4^{-2} + 2H^+ \quad (7)$$

Pyrite Degradation:

$$Fe^{+2} + \tfrac{1}{4}O_2 + H^+ \rightarrow Fe^{+3} + \tfrac{1}{2}H_2O \quad (8)$$

$$FeS + 14Fe^{+3} + 8H_2O \rightarrow 15Fe^{+2} + SO_4^{-2} + 16H^+ \quad (9)$$

It should be understood that while the precipitates may be predominantly Natrojarosite or Sideronatrite, they may include a mixed precipitate, and/or other metal-containing analogs of hydrated or anhydrous basic sodium or ammonium-containing metallic sulfates such as plumbojarosite, argentojarosite, beaverite, alunite, natroalunite, and the like, depending on the sulfate cake or scrubber wastes heavy metals content, or the content of such metals in any of the other reactants, be they fly ash, ash tank waste water, black water, leachate, pickle liquor or the like.

It should be understood the heavy metals content can be subjected to various mineral beneficiation or metallurgical methods and the like, for the separation and

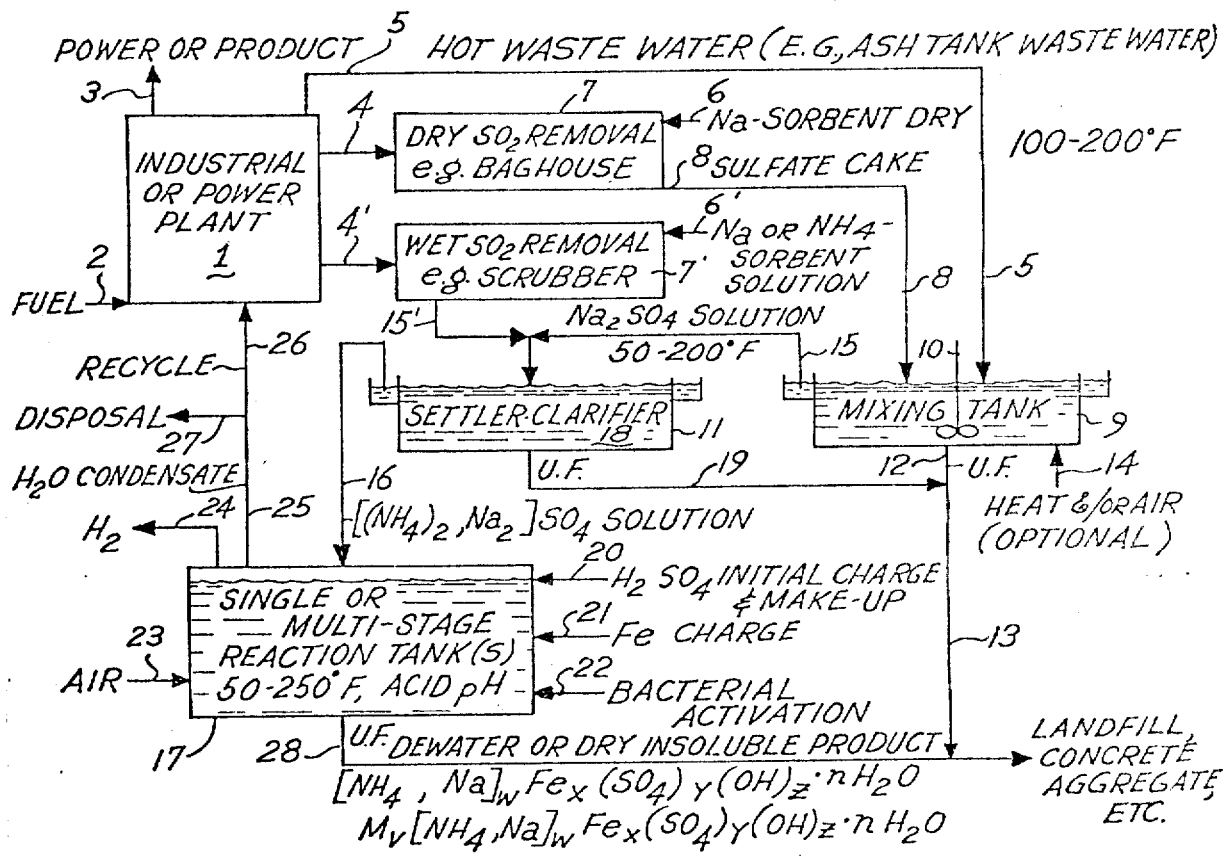
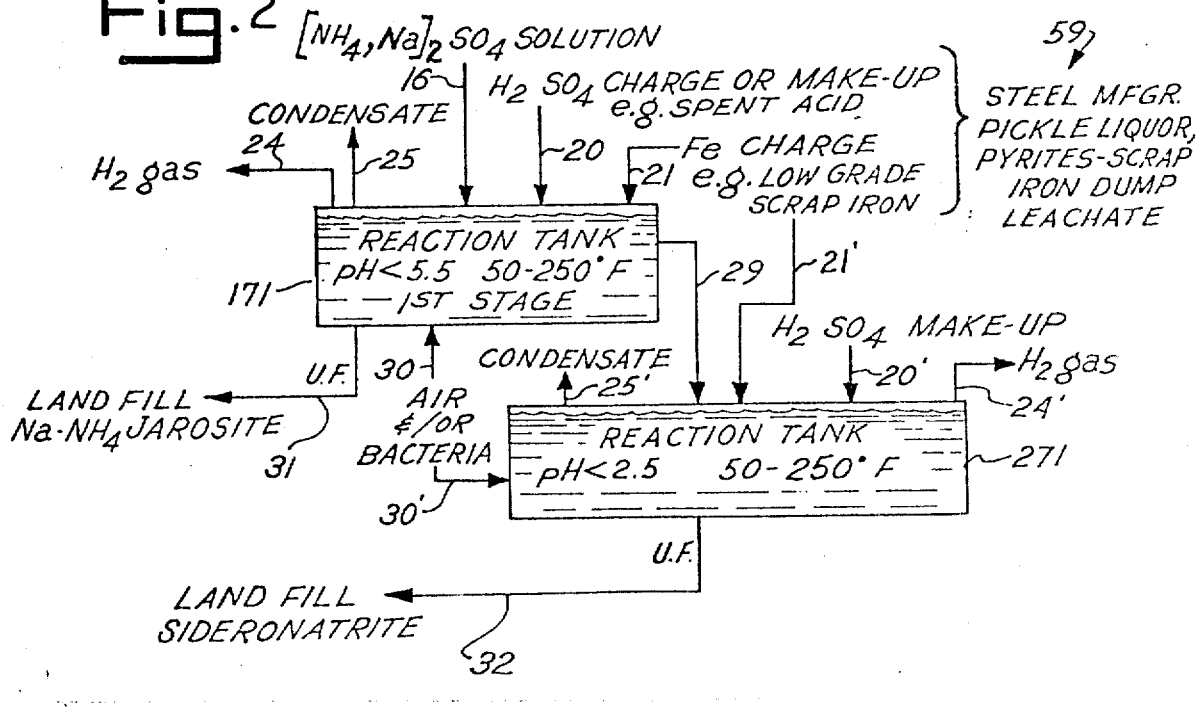

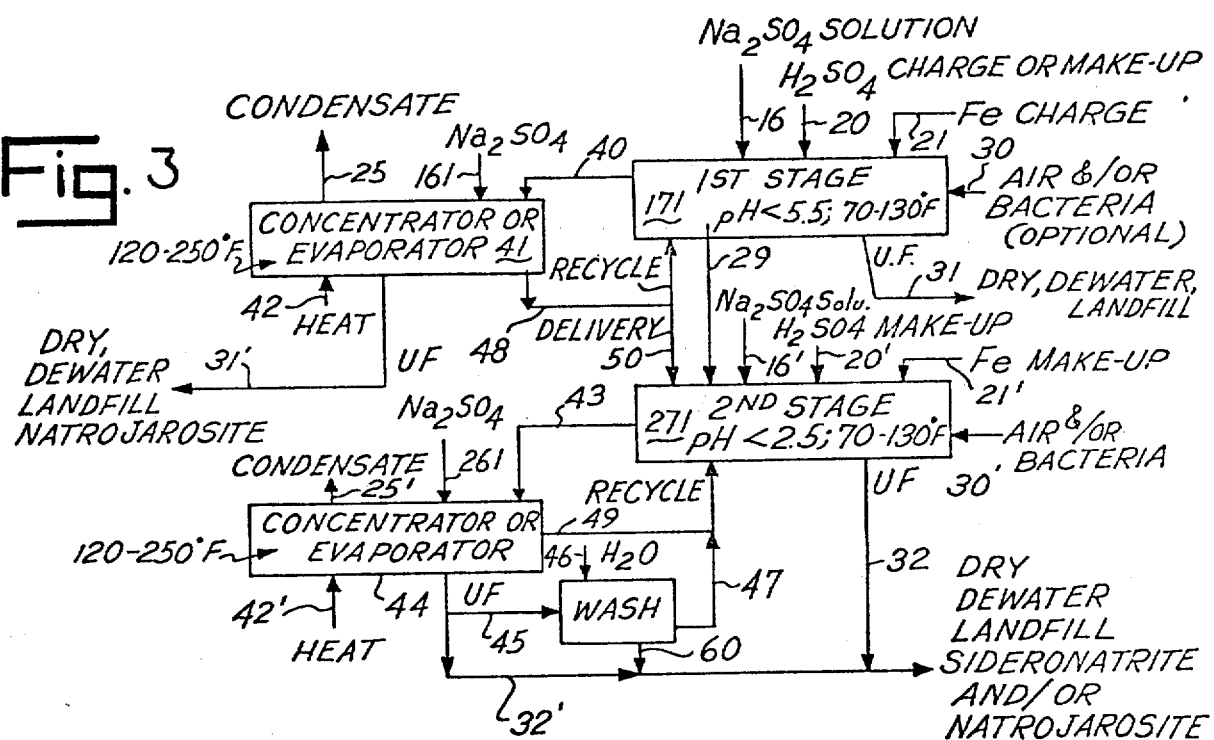
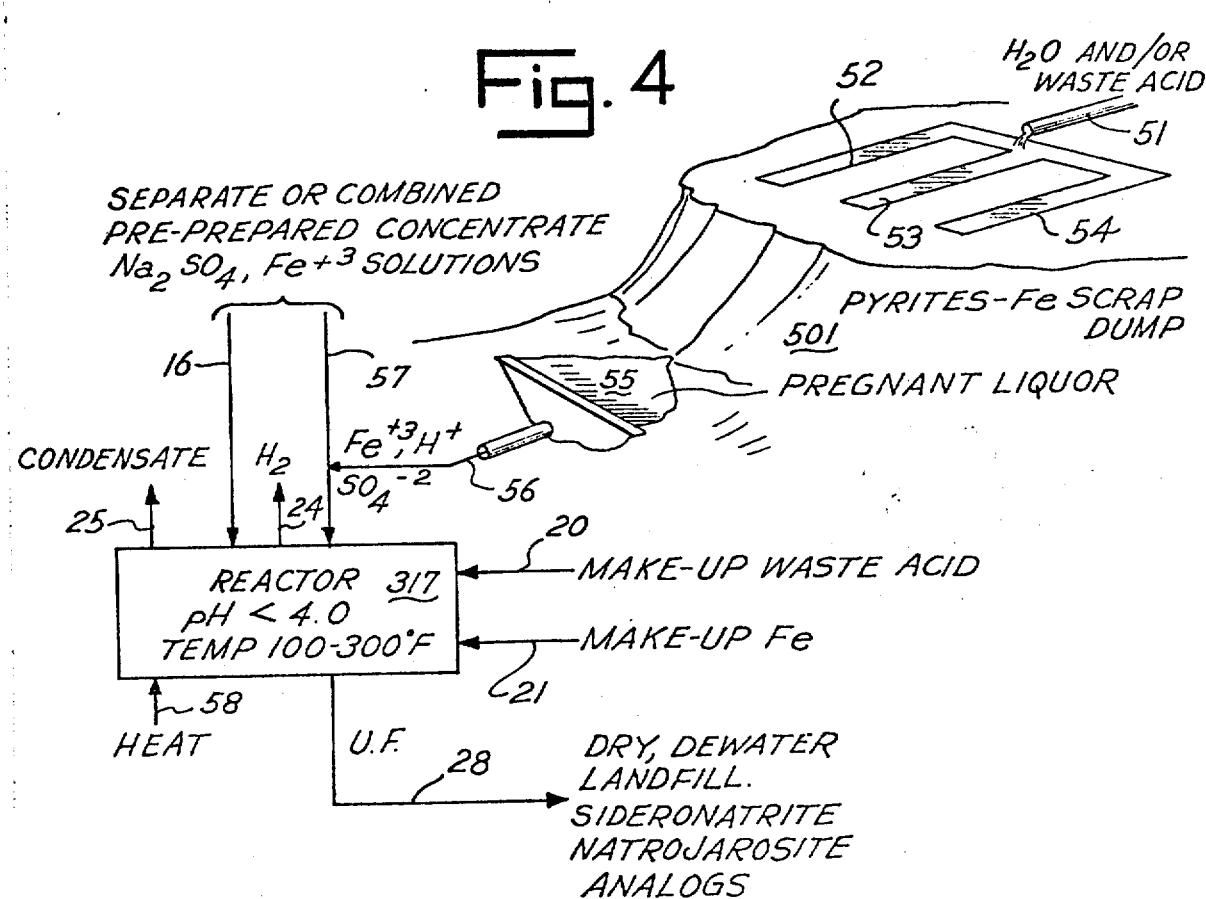

We claim:

1. A pollution control process for rendering insoluble water soluble wastes, said wastes being selected from $SO_2$ and particulates emissions control processes wastes, comprising the steps of:
   a. reacting in aqueous media a sulfur oxide anion, and a sodium or ammonium cation, or mixtures thereof, from a water soluble sulfur-containing salt waste, with a source containing metal values selected from $Fe^o$, $Fe^{+2}$, $Fe^{+3}$, $Al^{+3}$ and mixtures thereof;
   b. said sulfur-containing salt being produced as part of the waste in said emissions control process which employs a sodium or ammonium alkali sorbent, and which salt is selected from:

$$Q_aH_bSO_c,$$

where Q is selected from Na, $NH_4$, and mixtures thereof, $a$ is 1 or 2, $b$ is 0 or 1, and $c$ is 3 or 4, and mixtures thereof;
   c. maintaining said reaction at an acid pH below about 5.5 at a temperature in the range of from about 50°–300°F for a time sufficient to form a water insoluble compound selected from:

$$M_v[Na](Q)_w Fe_x(SO_4)_y(OH)_z \cdot nH_2O;$$

where Q is selected from Na, $NH_4$, and mixtures thereof; M is a metal present in said source or a metal present in said emissions control process waste, said metal selected from Co, Mg, Mn, B, Ti, Ca, Cu, Pb, Zn, As, Mo, Sn, Sb, Se, Ga, V, Ni, Be, Zr, Ag, Te, Bi, Hg, Sr, Ba, Cr, Pt, Pd, Al, U, Li, K, and mixtures thereof; $v$ is 0–4; $w$ is 0, 1, 2, 4 or 5; $x$ is 0, 1, 2, 3, 4 or 6; $y$ is 2, 4, 5, or 7; $u$ is 3 and/or 4; $z$ is 1, 2, 3, 6 or 12; $n$ is 0 or 3; when $w$ is zero $v$ or $x$ is an integer; when $x$ is zero $v$ is an integer and M includes Al; and mixtures thereof;
   d. thereby converting said sulfur-containing salt to a form exhibiting from about three to four orders of magnitude lower water solubility of the sodium, ammonium, or sulfur oxide as compared to the solubility thereof in said water-soluble sulfur-containing salt.

2. An insolubilization process as in claim 1 wherein the predominant insoluble compound is selected from:

$$M_v([Na]Q)_w Fe_x(SO_4)_y(OH)_z \cdot nH_2O,$$

where Q is selected from Na, $NH_4$, and mixtures thereof, M is $Al^{+3}$, $v$ is 0–3, $w$ is 1, 2, 4 or 5, $x$ is 0, 1, 2, 3 or 4, $y$ is 2, 4, 5 or 7, $u$ is 3 and/or 4, $z$ is 1, 2, 3 or 6, and $n$ is 0 or 3, when $x$ is zero, $v$ is an integer, and mixtures thereof.

3. An insolubilizing process as in claim 2 wherein said $SO_2$ or particulates emissions control process is a dry-type process.

4. An insolubilizing process as in claim 3 wherein said dry $SO_2$ emission control process is a sodium-type process employing an alakline sodium-containing compound reacted with a sulfur oxide pollutant to produce a sodium salt.

5. An insolubilizing process as in claim 4 wherein said sodium sorbent is selected from Nahcolite, Nahcolite ore, Dawsonite, Trona, Natron, soda ash, sodium sesquicarbonates, alkalized alumina, sodium bicarbonate, authigenic sodium-containing minerals, and mixtures thereof.

6. An insolubilization process as in claim 5 wherein said dry process employs said sodium sorbent in conjunction with reactor or collection means selected from a baghouse, a fluidized bed reactor, a cross-flow dry scrubber, a fixed bed reactor, a moving bed reactor, an electrostatic precipitator, an apitron, a tray reactor or combinations thereof.

7. An insolubilization process as in claim 6 wherein said collection means is a baghouse.

8. An insolubilization process as in claim 5 wherein said dry sorbent is reacted with a flue gas stream containing $SO_2$ or $SO_3$ and said reacted sorbent is slurried in water to dissolve said sulfur-containing salt.

9. An insolubilization process as in claim 8 wherein said water is hot, ash tank waste water from a power generation process.

10. An insolubilizing process as in claim 2 wherein said $SO_2$ or particulates emissions control process is a wet-type process.

11. An insolubilizing process as in claim 10 wherein said wet $SO_2$ emission control process is a sodium or ammonium-type process employing an alkaline sorbent compound selected from sodium and ammonium oxides, hydroxides, carbonates, bicarbonates, sulfites, bisulfites, and mixtures thereof.

12. An insolubilizing process as in claim 11 wherein said alkaline sorbent compound is selected from sodium hydroxide, Nahcolite, Nahcolite ore, Trona, Natron, sodium bicarbonate, soda ash, sodium sesquicarbonates, ammonia, ammonium hydroxide, sodium bisulfite, sodium sulfite, ammonium bisulfite, ammonium sulfite, authigenic sodium-containing minerals, and mixtures thereof.

13. An insolubilization process as in claim 12 wherein said sorbent is employed in a wet scrubber.

14. An insolubilizing process as in claim 2 wherein said source containing iron is an aqueous solution containing cationic iron ions selected from ferrous ions, ferric ions, and mixtures thereof.

15. An insolubilizing process as in claim 2 wherein said source containing iron includes iron in an elemental or combined state.

16. An insolubilizing process as in claim 15 which includes the step of oxidizing said iron to the ferric state.

17. An insolubilizing process as in claim 16 wherein said oxidation takes place in the presence of acid tolerant iron-oxidizing bacteria.

18. An insolubilizing process as in claim 2 wherein said reaction occurs in a plurality of zones.

19. An insolubilizing process as in claim 18 wherein said iron source includes iron in an elemental, combined, or ferrous state which is oxidized to the ferric state in a zone separate from the insoluble compound formation reaction zone.

20. An insolubilization process as in claim 19 wherein said sulfur oxide anion, and sodium or ammonium cation, or mixtures thereof, are added directly to a first heated zone separately from a second zone in which ferric ion is prepared biotically or abiotically.

21. An insolubilization process as in claim 20 wherein said second zone includes biotic production of ferric ion and sulfuric acid.

22. An insolubilization process as in claim 21 wherein said second zone is maintained at a temperature in the range of from about 70°–130° F., and a pH within the range of from about 1.0–5.5.

23. An insolubilization process as in claim 22 wherein said first zone is maintained at a temperature in the range of from about 120°–250° F.

24. An insolubilization process as in claim 22 wherein said second zone includes at least two stages, each being maintained at a different pH for biotic oxidation of $Fe^o$ to $Fe^{+2}$ in a first stage thereof, and $Fe^{+2}$ to $Fe^{+3}$ in a second stage.

25. An insolubilization process as in claim 2 wherein the predominant insoluble compound is selected from Natrojarosite, Sideronatrite, Metasideronatrite, Rosarite, Iriite, Ammonionatrite, Natroalunite, Ammonioalunite and mixtures thereof.

26. An insolubilization process as in claim 25 wherein the predominant insoluble compound is selected from Natrojarosite, Sideronatrite, Metasideronatrite, Rosarite, and Iriite.

27. An insolubilization process as in claim 2 wherein maintaining said reaction includes the steps of:
  e. commencing said reaction to form said insoluble compound at a pH initially below 4 to inhibit formation of ferrous or ferric hydroxides, and
  f. adjusting the pH above 4 to within at least the lower end of the range of pH at which production of one or more of said hydroxides otherwise could occur, while reducing the ferric ion concentration,
  g. thereby selectively forming said compound in the absence of substantial production of said hydroxide.

28. An insolubilization process as in claim 27 which includes the step of seeding said reaction with crystals of said compound prior to raising said pH.

29. An insolubilization process as in claim 2 wherein said temperature below about 200° F.

30. An insolubilization process as in claim 2 wherein said initial pH is below about 2.5 and said temperature is below about 150° F.

31. An insolubilization process as in claim 2 wherein said iron is $Fe^{+3}$ and said acid is sulfuric acid.

32. An insolubilization process as in claim 31 wherein said $Fe^{+3}$ and sulfuric acid sources are selected from waste acid, pickle liquor, scrap iron, iron slag, pyrites, acid mine water, black water, gob, slag, pyrite leachate, ground water, furnace dust, fly ash, $SO_2$ and $SO_3$-containing flue gas, industrial plant waste water, and mixtures thereof.

33. An insolubilization process as in claim 2 wherein said reaction is maintained in aqueous solution.

34. An insolubilization process as in claim 33 wherein said compound is separated from said solution and disposed of.

35. An insolubilization process as claim 34 wherein said disposal includes landfilling a portion of said compound formed.

36. An insolubilization process as in claim 33 wherein the source of at least a portion of the water of said aqueous solution is hot waste water from an industrial process.

37. An insolubilization process as in claim 36 wherein said industrial process is selected from power generation, heat generation, non-ferrous metal smelting, glass manufacture, or paper manufacture.

38. An insolubilization process as in claim 37 wherein said industrial process is power generation and said water is hot, ash tank waste water.

39. An insolubilization process as in claim 2 wherein said sulfur-containing salt is introduced into said reaction in an aqueous solution.

40. A process as in claim 2 wherein said sulfur oxide salt is produced in a sulfite-bisulfite flue gas $SO_2$ emissions control process.

* * * * *

UNITED STATES PATENT AND TRADEMARK OFFICE
CERTIFICATE OF CORRECTION

PATENT NO. : 3,984,312
DATED : October 5, 1976
INVENTOR(S) : Jacques M. Dulin, et al It is certified that error appears in the above-identified patent and that said Letters Patent are hereby corrected as shown below:

Abstract, lines 8 and 9, the formula "$M_v(Na,NH_4)_w Fe_x(SO_u)_y(OH_z) nH_2O$" should read --$M_v(Na,NH_4)_w Fe_x(SO_u)_y(OH)_z \cdot nH_2O$--.

Abstract, line 36, "40 Claims, No Drawings" should read --40 Claims, 4 Drawing Figures--.

Column 2, line 56, "bisulphites" should read --bisulfites--.

Column 2, line 64, "statuatory" should read --statutory--.

Column 3, line 12, "dimethylanaline" should read --dimethylaniline--.

Column 3, line 33, "reberberatory" should read --reverbatory--.

Column 4, line 61, "FE$_3$" should read --Fe$_3$--.

Column 8, line 59, "ferrir" should read --ferric--.

Column 9, line 4, "industrual" should read --industrial--.

Column 9, line 46, "=200" should read -- -200 --.

Column 15, line 25, "Sideronatrite" should read --Sideronatrite,--.

Column 15, line 56, "backwashs" should read --backwash--.

Column 15, line 62, "bacterial" should read --bacteria--.

Column 16, line 3, "or/evaporator" should read --or evaporator--.

UNITED STATES PATENT AND TRADEMARK OFFICE
CERTIFICATE OF CORRECTION

PATENT NO. : 3,984,312
DATED : October 5, 1976
INVENTOR(S) : Jacques M. Dulin, et al It is certified that error appears in the above—identified patent and that said Letters Patent are hereby corrected as shown below:

Column 20, line 42, "FE3" should read --$Fe_3$--.

Column 23, line 37, "$M_v[Na](Q)_w Fe_x (SO_u)_y (OH)_z \cdot nH_2O;$" should read --$M_v(Q)_w Fe_x (SO_u)_y (OH)_z \cdot nH_2O;$--.

Column 23, line 59, "$M_v([Na]Q)_w Fe_x (SO_u)_y (OH)_z \cdot nH_2O;$" should read --$M_v(Q)_w Fe_x (SO_u)_y (OH)_z \cdot nH_2O;$--.

Column 24, line 3, "alakline" should read --alkaline--.

Column 26, line 5, after "temperature" please insert --is maintained--.

The sheets of drawings containing Figures 1-4, should appear as shown on the attached sheets, as part of Letters Patent 3,984,312.

Signed and Sealed this

Twenty-second Day of March 1977

[SEAL]

Attest:

RUTH C. MASON
*Attesting Officer*

C. MARSHALL DANN
*Commissioner of Patents and Trademarks*